(12) United States Patent
Thomas et al.

(10) Patent No.: US 10,526,978 B2
(45) Date of Patent: Jan. 7, 2020

(54) ASSEMBLY FOR ATTACHING A NOZZLE TO A STRUCTURAL ELEMENT OF A TURBINE ENGINE

(71) Applicant: SAFRAN AIRCRAFT ENGINES, Paris (FR)

(72) Inventors: Axel Sylvain Loïc Thomas, Moissy-Cramayel (FR); Maurice Guy Judet, Moissy-Cramayel (FR); Gabrijel Radeljak, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/314,431

(22) PCT Filed: Jun. 22, 2017

(86) PCT No.: PCT/FR2017/051655
§ 371 (c)(1),
(2) Date: Dec. 30, 2018

(87) PCT Pub. No.: WO2018/002480
PCT Pub. Date: Jan. 4, 2018

(65) Prior Publication Data
US 2019/0203649 A1    Jul. 4, 2019

(30) Foreign Application Priority Data

Jun. 30, 2016   (FR) ...................................... 16 56235

(51) Int. Cl.
*F02C 7/20*     (2006.01)
*F02C 9/16*     (2006.01)
*F01D 25/24*    (2006.01)

(52) U.S. Cl.
CPC .............. *F02C 9/16* (2013.01); *F01D 25/243* (2013.01); *F02C 7/20* (2013.01); *F05D 2220/32* (2013.01);
(Continued)

(58) Field of Classification Search
None
See application file for complete search history.

(56) References Cited

U.S. PATENT DOCUMENTS 4,627,233 A     12/1986  Baran
5,232,340 A *    8/1993  Morgan .................. F01D 9/042
                                                   415/190

(Continued)

FOREIGN PATENT DOCUMENTS

EP      0161203 A1   11/1985
FR      2908153 A1    5/2008

OTHER PUBLICATIONS

Machine Translation of International Patent Application No. PCT/FR2017/051655, International Search Report and Written Opinion dated Oct. 6, 2017, 6 pgs.
(Continued)

*Primary Examiner* — Michael Lebentritt
(74) *Attorney, Agent, or Firm* — Lathrop Gage LLP

(57) ABSTRACT

The present invention relates to an assembly (10) comprising:
  an annular nozzle (4) of a turbine of a turbine engine,
  a structural annular element (6) of the turbine engine,
  the nozzle (4) and the structural annular element (6) each comprising a radial flange (16, 18), the flanges being applied axially onto one another, and
  at least one member (12) for axially retaining the flange (16) of the nozzle (4) with the flange (18) of the structural annular element (6), with the member being
(Continued)

applied to one of the flanges and being able to axially retain the two flanges one on top of the other.

14 Claims, 5 Drawing Sheets

(52) U.S. Cl.
CPC ...... *F05D 2240/40* (2013.01); *F05D 2260/30* (2013.01); *F05D 2260/37* (2013.01); *F05D 2260/38* (2013.01); *F05D 2260/39* (2013.01)

(56) References Cited

U.S. PATENT DOCUMENTS

| | | | | |
|---|---|---|---|---|
| 5,343,694 A | * | 9/1994 | Toborg | F01D 9/042 415/209.2 |
| 5,848,854 A | | 12/1998 | Brackett | |
| 2006/0127215 A1 | | 6/2006 | Durocher et al. | |
| 2009/0038311 A1 | * | 2/2009 | Snook | F01D 9/041 60/747 |
| 2012/0047734 A1 | * | 3/2012 | Miller | B23P 6/005 29/888.021 |
| 2014/0014792 A1 | * | 1/2014 | Willis | F16B 41/002 248/200 |
| 2015/0098812 A1 | * | 4/2015 | Paradis | F01D 9/04 415/209.3 |
| 2016/0003102 A1 | | 1/2016 | Synnott | |
| 2019/0169990 A1 | * | 6/2019 | Chaboud | F01D 5/066 |

OTHER PUBLICATIONS

International Patent Application No. PCT/FR2017/051655, International Search Report and Written Opinion dated Oct. 6, 2017, 8 pgs. (relevance found in the citations in English).

* cited by examiner

ASSEMBLY FOR ATTACHING A NOZZLE TO A STRUCTURAL ELEMENT OF A TURBINE ENGINE

CROSS-REFERENCE TO RELATED APPLICATIONS

This application is a 35 U.S.C. § 371 filing of International Application No. PCT/FR2017/051655, filed Jun. 22, 2017, which claims the benefit of priority to French Patent Application No. 1656235, filed Jun. 30, 2016, each of which is incorporated herein by reference in its entirety.

This invention relates to the attachment of a nozzle to a turbine engine.

Turbine engines, whether of the turboprop or turbojet type, comprise annular nozzles mounted along an axis of the turbine engine, about which the moving elements of the turbine engine rotate. These nozzles are used to guide and/or straighten an air flow through the turbine engine from in the downstream direction.

In the following text, it will be understood that the terms "upstream" and "downstream" are defined in relation to the direction of flow or circulation of a fluid, such as air, through the turbine engine, upstream defining where the fluid comes from, onto a member such as a nozzle, downstream defining where the fluid passes the member.

Similarly, the term "axial" refers to an axis along which air flows in the downstream direction and which is an axis of rotation of the rotors of the turbine engine. The term "radial", in turn, refers to a direction substantially perpendicular to the axial direction.

The nozzles can be formed in one piece comprising an inner annular shroud and an outer annular shroud coaxially connected by substantially radial blades, or be an assembly of several nozzle sectors, each comprising one or more blades the ends of which are connected by an inner shroud sector and an outer shroud sector, with the sectors being positioned circumferentially end-to-end to provide an annular row of stationary or stator vanes.

The nozzles are mounted and attached to structural elements of the turbine engine, e. g. a stationary case of the turbo machine.

When mounted on the cases, the nozzles are not tight and can accept small axial movements, particularly caused by the thermal expansion of the nozzles or the case.

The ability of the nozzles to perform axial movements is essential, in particular to prevent the nozzles from being subjected to excessive stresses that could damage same and, in the worst case, cause them to explode, thereby causing serious damage to the turbine engine.

A known principle for attaching a nozzle, and more particularly nozzle sectors, described in document FR2908153, in the name of the Applicant, consists in mounting the sectors on the case using attaching elements cooperating with an engagement-holding portion cooperating with an internal shroud of the sector and an internal case.

Although this principle ensures that the sectors are properly attached to the case, it has some drawbacks. As a matter of fact, this attaching principle requires the use of tools for bolt handling and a significant strength from the assembly operator. Besides, the proposed assembly leaves the nozzle almost no degree of freedom in the axial direction. Eventually, this principle involves a large number of parts, which reduces its easiness of implementation and increases the duration and complexity of maintenance.

The invention specifically aims at overcoming such drawbacks by providing a simple, fast and durable way of mounting a nozzle on a stationary structural element, such as a case, of a turbine engine.

The invention more particularly aims at providing a simple, efficient and cost-effective solution to this problem.

For this purpose, the invention first provides for an assembly which comprises:
  an annular nozzle of a turbine of a turbine engine,
  a structural annular member of the turbine engine,
  the nozzle and the structural annular element each comprising a radial flange, with the flanges being applied axially onto one another,
  at least one member for axially retaining the nozzle flange with the flange of the structural annular element, with the member comprising:
    a first portion applied in the axial direction on a first flange of said nozzle or said structural annular member, and comprising at least a first radial locking means axially engaged with a second complementary radial locking means formed on or secured to the first flange for radially locking the member on the first flange.
    a second hook-shaped portion carried by the first portion and having a free end arranged opposite a second flange of said nozzle or of said structural annular element.

The retaining member limits the axial movement of the nozzle so that the nozzle can move in response to thermal stresses without however being released from the structural annular element. In addition, the member is removably mounted on the nozzle or the annular element so that the disengagement of the nozzle and the structural element can be achieved by simply disassembling the member.

The support of the first portion on the first flange can be achieved by means of a resiliently deformable tab carried by the first portion and elastically stressed in the axial direction on an axial stop of the nozzle or the structural annular element, with the tab extending opposite the second hook-shaped portion with respect to the first portion.

The resiliently deformable tab may include an angled portion extending axially between the axial stop and the first portion of the member.

To facilitate the assembling and disassembling of the retaining member and avoid the use of tools, said at least one first means of the member is a ring delimiting a housing for receiving the second means protruding from the first flange and towards said axial stop.

In a first embodiment of the invention, the ring forms a portion of a first flank of a U-shaped portion, the second flank of which is formed by the free end of the second hook-shaped portion.

In a second embodiment of the invention making it possible to ensure a correct radial locking of the member, the latter may comprise two first means which are two rings spaced circumferentially from each other and which each cooperate with a second means of the first flange.

In a particular arrangement of the retaining member, the two rings are arranged on either side of a circumferential wall forming, with the free end of the second hook-shaped portion, a first flank and a second flank of a U-shaped portion respectively According to a first alternative solution of this arrangement, at least one of said two rings has a slot, so as to enable a clipping insertion of said ring carrying the slot onto a second means protruding from the first flange.

Advantageously, each ring has a slot, said two slots being oriented at 90° to each other. One of the slots is thus angularly positioned on a first of the rings so as to enable the radial clipping of the first ring onto a second means of the first flange, with the member extending substantially radially. The slot of the second ring is positioned angularly on the second ring and relative to the slot of the first ring so as to enable the rotational clipping about the second means for holding the first ring until the second ring can be clipped into a second means of the first flange.

In one embodiment of the invention, the second means is a pin passing through both the flange of the nozzle and the flange of the structural annular member and a portion or head of which is protruding from the first flange to the stop.

In order to ensure that the nozzle moves relative to the structural element in response to thermal stresses, the free end of the hook is arranged with some axial clearance opposite the second flange.

The axial distance between the two flanks is strictly greater than the sum of the axial dimensions of the two flanges and said protruding portion or head of said pin.

In an alternative solution, the nozzle consists of several angular sectors arranged circumferentially end-to-end, the assembly comprising several axial retaining members each enabling to axially retaining a single sector or two abutting sectors.

Secondly, it is proposed that an axial retaining member be provided for an assembly as previously described, comprising:
- a U-shaped portion comprising a first flank and a second flank facing each other,
- a resiliently deformable tab protruding from the first flank in a direction opposite the second flank, and
- at least one ring, the outline of which extends in the same plane as the first flank.

The invention will be better understood and other details, characteristics, and advantages of the invention will appear on reading the following description given by way of non-limiting example and with reference to the appended drawings, in which:

FIG. 7b is a perspective view of the downstream of the entire FIG. 7a;

Figure 1:
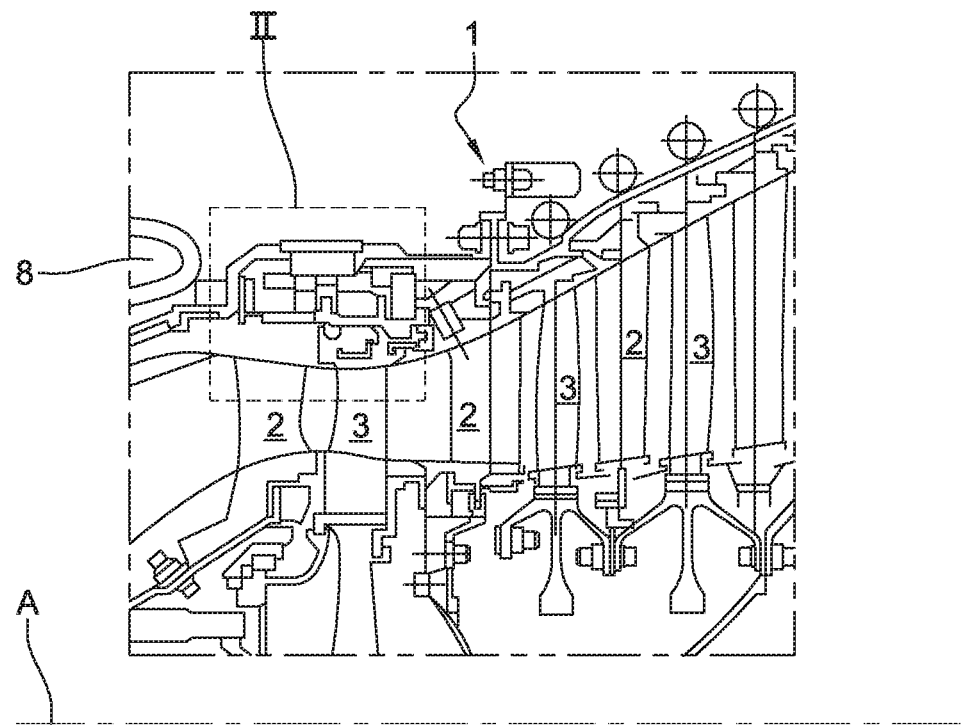
FIG. 1 is a partial sectional view of a turbine of a turbine engine.

FIG. 1 shows a turbine 1 of a turbine engine arranged downstream of a combustion chamber and comprising a plurality of annular rows of turbine stator blades 2 alternating, along the axis A of the turbine, with turbine wheels 3.

Figure 2:
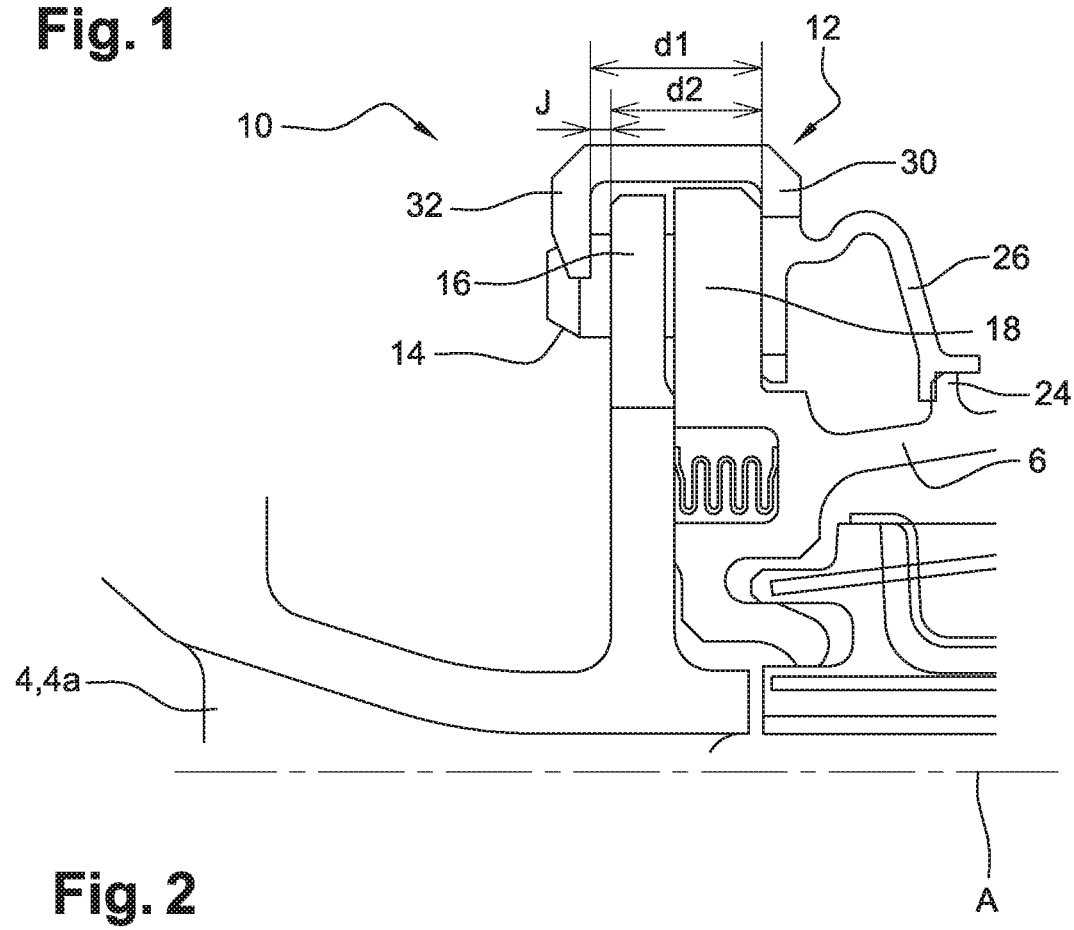
FIG. 2 is a schematic cross-sectional view of a detail according to box II of FIG. 1, showing an assembly comprising an annular nozzle of a turbine engine, an annular element of a turbine engine and an axial retaining member for the annular element and the annular nozzle.

FIG. 2 is a larger scale view of Zone II in FIG. 1 and represents the nozzle 4 of the high-pressure turbine positioned immediately downstream of the combustion chamber.

In this FIG. 2, assembly 10 includes a structural element 6 of the turbine engine, the nozzle 4 mounted coaxially with the structural element 6, a member 12 for axially retaining the nozzle 4 12 with the structural element 6, and at least one pin 14 enabling, on the one hand, the positioning of the member 12 and, on the other hand, the positioning of the nozzle 4 relative to the structural element 6. Advantageously, at least a portion of the axial retaining member 12 and said at least one pin 14 together form means for radially locking the member 12 relative to nozzle 4 and the structural element 6.

The nozzle 4 and the structural element 6 each have a flange 16, 18 by which they are assembled together by axial application of one onto the other. However, for the operation of the turbine engine 2, nozzle 4 must accept, in relation to the structural element 6, an axial translation movement, in particular to take into account the thermal expansion of these portions, given the downstream positions thereof relative to the combustion chamber 8.

In the description made in connection with the Figures, the flange 18 of the structural element 6 forms a first flange and flange 16 of the nozzle 4 forms a second flange.

Figure 7A:
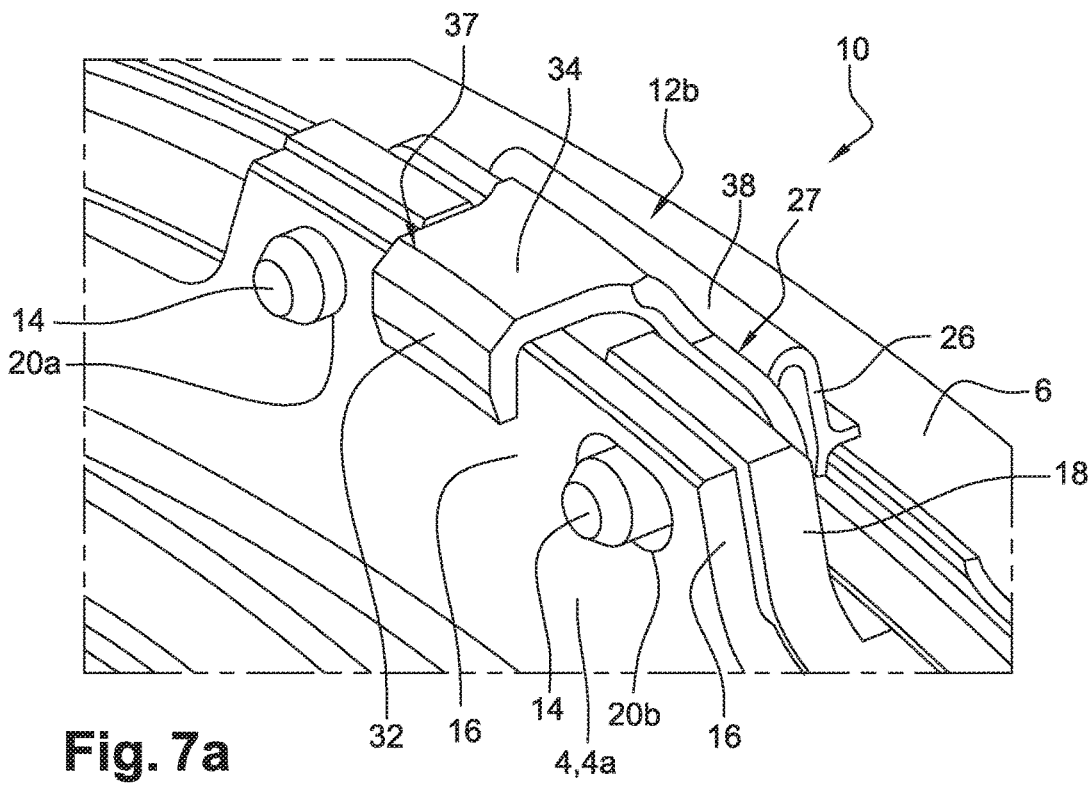
FIG. 7a is a perspective view from the upstream of the entire FIG. 2 in a first configuration.

Thus, as shown in the Figures, the pins 14 go through, and are attached to the first flange 18 of the structural element 6, and also go through holes 20a, 20b formed on the second flange 16 of the nozzle 4 (FIG. 7a).

Advantageously, the assembly 10 includes at least two cylindrical pins 14, each with a head 22 protruding from the first flange 18. The second flange 16 of the nozzle 4 has two holes 20a, 20b, a first hole 20a of which has a substantially circular outline having a diameter which is slightly larger than the diameter of the pins 14, and a second hole 20b with an elongated outline for receiving one of the pins 14 and for circumferentially adjusting the position of the nozzle 4 when mounting same. The nozzle 4 can then axially move along the pins 14, according to its thermal expansion.

Of course, both the nozzle 4 and structural element 6 can have several first 18 and second 16 flanges cooperating together or each have an annular flange.

In addition, one of the nozzles 4 and the structural element 6 includes a stop 24 for retaining an elastic tab 26 of the member 12 as explained below. Advantageously, this stop 24 is formed by an annular rib formed on the radially outer periphery of the nozzle 4 or of the structural element 6 on the side of which the head 22 of the pin 14 protrudes. Preferably, and as shown in the Figures, the annular rib is made on structural element 6.

The member 12, which will be described according to several embodiments, with reference to FIGS. 3 to 6, aims at limiting the axial movement of the nozzle 4 relative to the structural element 6.

In all the embodiments of the member shown in FIGS. 3 to 6, the member 12a, 12b, 12c, 12d comprises a first portion 27 or wall extending substantially circumferentially from which a resiliently deformable tab 26 extends in a first direction and in a second direction opposite the first direction a second hook-shaped portion 37. The second hook-shaped portion 37 includes a free end 32 curved in the radial direction and connected to the first portion by a base 34. The first portion 27 and the free end 32 are separated by a distance d1.

The first portion 27 includes at least one ring 36, 39, 41 delimiting a housing for receiving a head 22 of a pin 14.

Preferably, the elastic tab 26 includes an angled portion 38 through which the elastic tab 26 is connected to the first portion 27. The angled portion 38 is shaped so that the apex of the angle is oriented radially outwards so that the elastic tab 26 substantially forms an inverted V in the radial direction.

Figure 3:
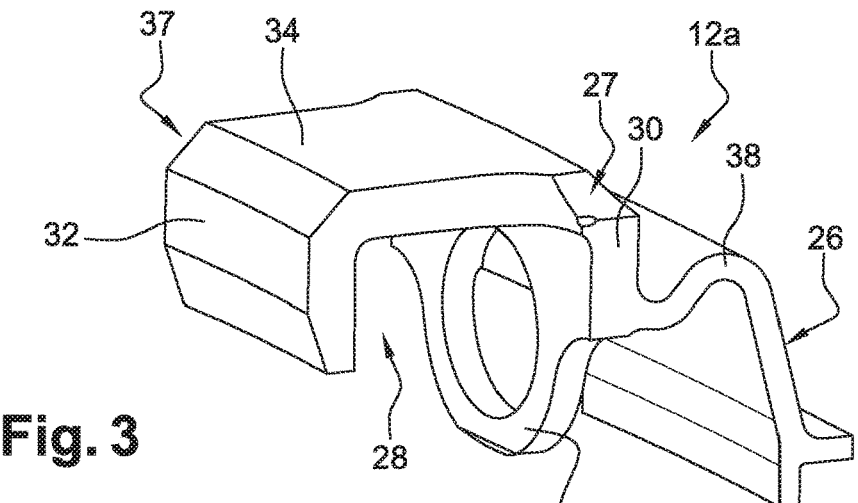
FIG. 3 is a perspective view of an axial retaining member according to a first embodiment.

According to a first embodiment shown in FIG. 3, the first portion 27 of the member 12a comprises a single ring 36 formed axially opposite the free end of the hook. In this embodiment, the ring 36 is formed opposite the hook-shaped free end 32 so as to form a first flank of a U-shaped portion the second flank is formed by the hook-shaped free end 32 of the second portion 37.

Figure 4:
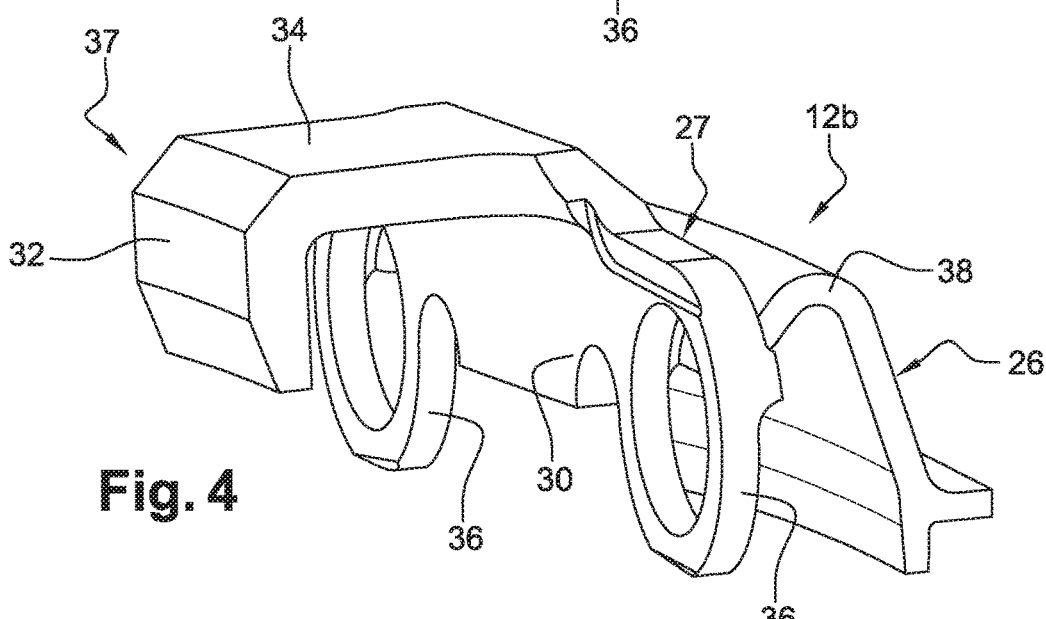
FIG. 4 is a perspective view of an axial retaining member according to a second embodiment.

According to a second embodiment shown in FIG. 4, the first portion 27 of the member 12b comprises two rings 36 spaced circumferentially from each other and on either side of a circumferential wall 30. The circumferential wall forms a first flank and a second flank of a U-shaped portion with the free end 32 of the second hook-shaped portion 37.

As can be seen, the ring 36 of member 12a in FIG. 3 and the rings 36 of the member 12b in FIG. 4 have closed outlines.

Figure 5:
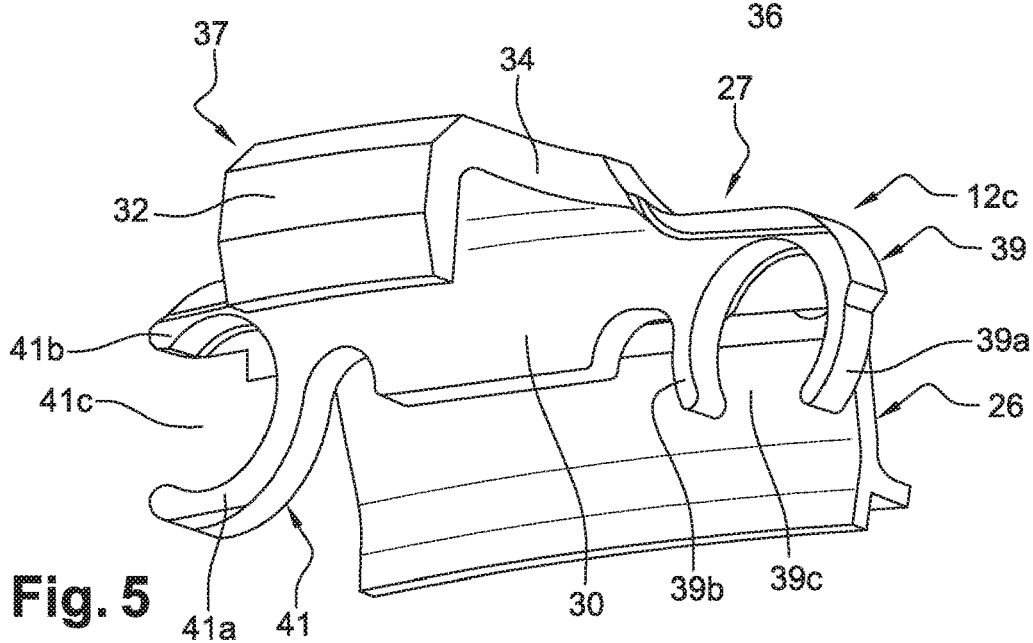
FIG. 5 is a perspective view of an axial retaining member according to a third embodiment.

According to a third embodiment shown in FIG. 5, the member 12c is similar to that in FIG. 4 but differs in that the two rings 39, 41 are split or have open outlines. The slots 39c, 41c of the rings 39, 41 are oriented at 90° relative to each other. The slot 39c of the first ring 39 is oriented substantially radially and the slot 41c of the second ring 41 is oriented circumferentially and in a circumferential direction opposite the first ring 39. The slots 39c, 41c create in each of the rings 39, 41 two elastic branches 39a, 39b, 41a, 41b, 41b, with the distance separating the two free ends of the branches 39a, 39b, 41a, 41b being smaller than the diameter of the head 22 of the pin 14. The function of these branches 39a, 39b, 41a, 41a, 41b and the sizing of the above spacing will be explained below.

Figure 6:
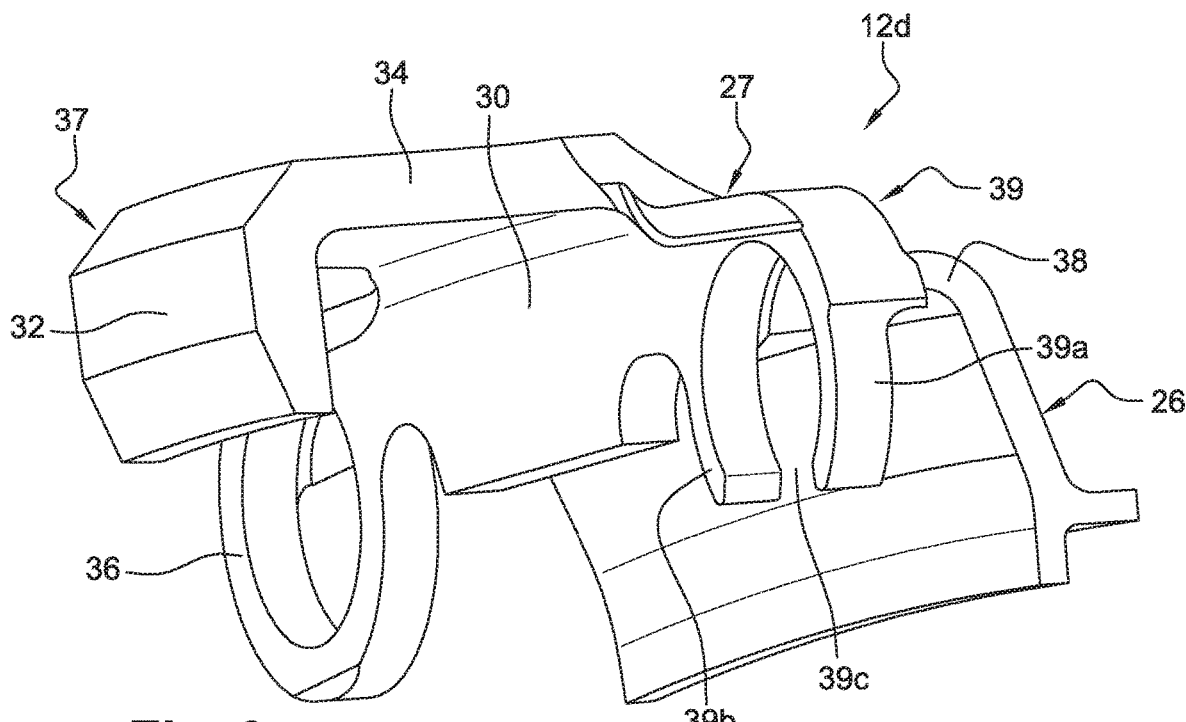
FIG. 6 is a perspective view of an axial retaining member according to a fourth embodiment.

According to a fourth embodiment shown in FIG. 6, member 12d is a combination of the embodiments of FIGS. 4 and 5, i. e. only one of the rings 39 is split, with the slot 39c being oriented in the radial direction as on the member 12c in FIG. 5. The second ring 36 is a ring having a closed outline.

When mounted on the nozzle 4 and on the structural element 6, the member 12 is radially engaged on the first and second flanges 16, 18 and the 28 U-shaped portion overlaps the flanges 16, 18.

Figure 7B:
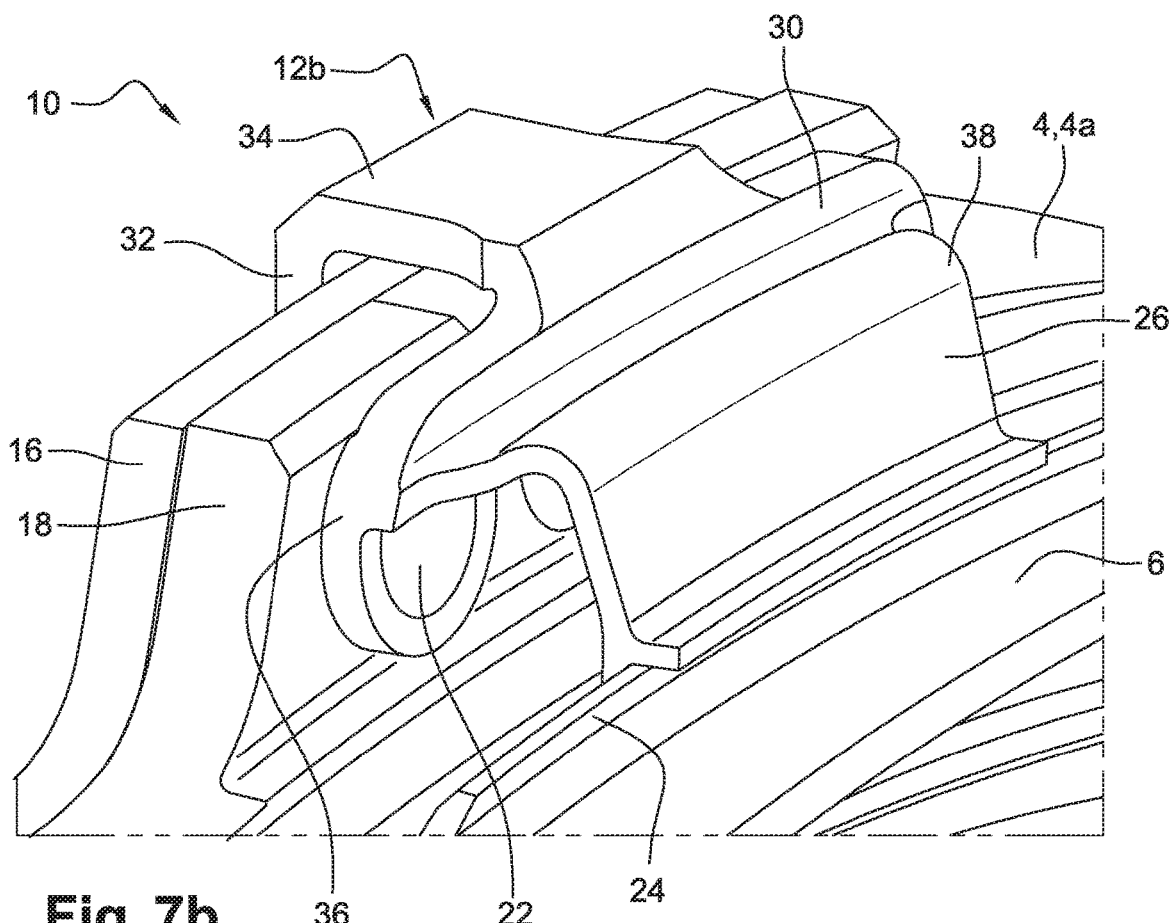

FIGS. 7a and 7b show, in a first configuration, an assembly 10 comprising a member 12 according to the second embodiment, i. e. as shown in FIG. 4.

As can be seen in FIG. 7a, the first portion 27 formed by the two rings 36 and the intermediate circumferential wall 30 is in contact with the first flange 18, i. e. the flange of the structural element 6. As shown in FIG. 7b, now, the rings 36 of the member 12b each surround the head 22 of one of the pins 14 so that the member 12 cannot be moved radially nor circumferentially.

It should be noted that if the first portion 27 of the member 12b is applied onto the first flange 18 of the structural element 6, the free end 32 of the second hook-shaped portion 37 is arranged with a clearance J axially facing the second flange 16, i. e. the flange of the nozzle 4. Thus, the distance d1 between the two flanks 30, 32 of the U-shaped portion is greater than a distance d2 corresponding to the sum of the thicknesses of the two flanges 16, 18 and the head 22 of the pin 14. The distances d1, d2 and the clearance J are better visible in FIG. 2.

As regards the embodiments shown in FIGS. 3, 4 and 6, the clearance J is greater than the thickness of the head 22 of the pins 14 so as to enable the axial insertion of the rings 36 of the members 12a, 12b, 12d on the heads 22 of the pins 14.

The mounting of the member 12 of FIGS. 3 and 4 is explained below.

First, the elastic tab 26 is deformed by giving it an axial compression so as to reduce the opening of the angle, then member 12 is positioned so that the first portion 27 is pressed against the first flange 18, the heads 22 of the pins 14 being each received in one of the rings 36. Eventually, in a third step, the compressive elastic stress applied to the tab 26 is released so that the tab 26 comes into contact with the stop 24 of the first flange 18.

When the member 12 is positioned, the clearance J is provided, thus allowing the axial displacement of nozzle 4 as a function of temperature.

Figure 8:
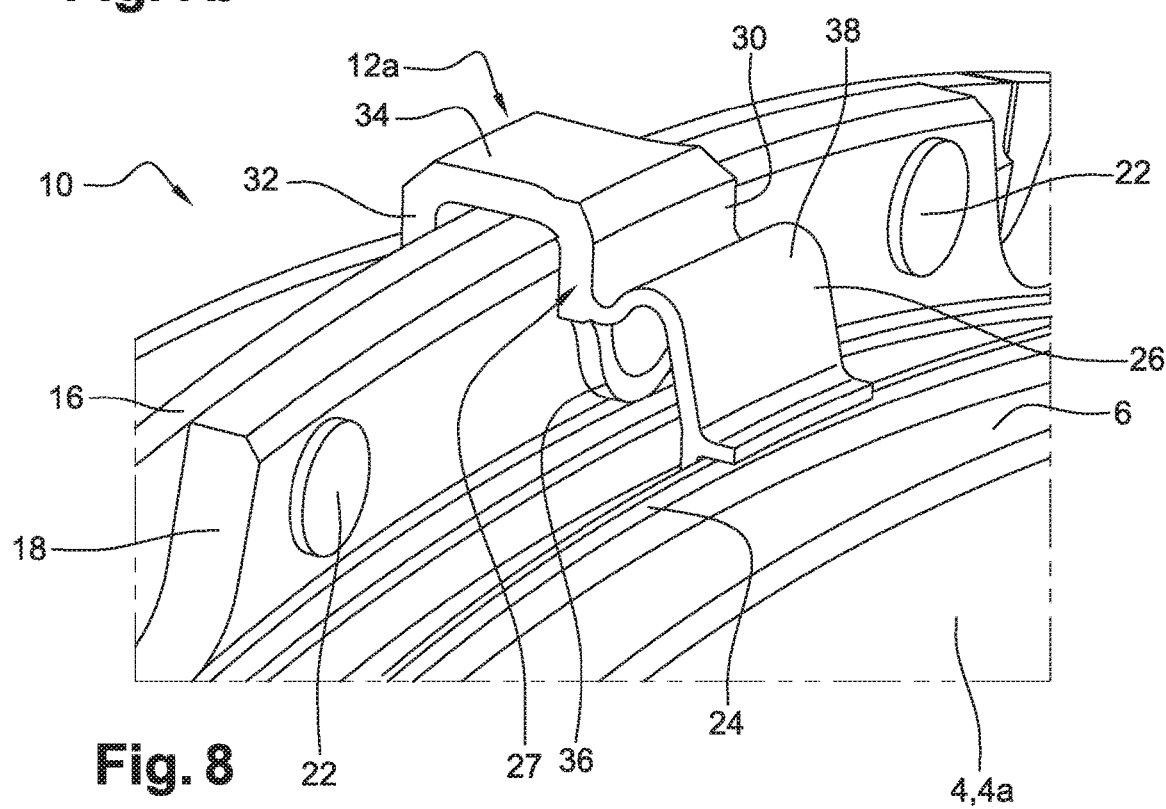
FIG. 8 is a perspective view of the entire FIG. 2 including the retaining member of FIG. 3.

FIG. 8 shows, in a second configuration, an assembly 10 in which the member 12a is made according to the embodiment of FIG. 3. In this configuration, the assembly of component 12 is carried out as described above.

Figure 9:
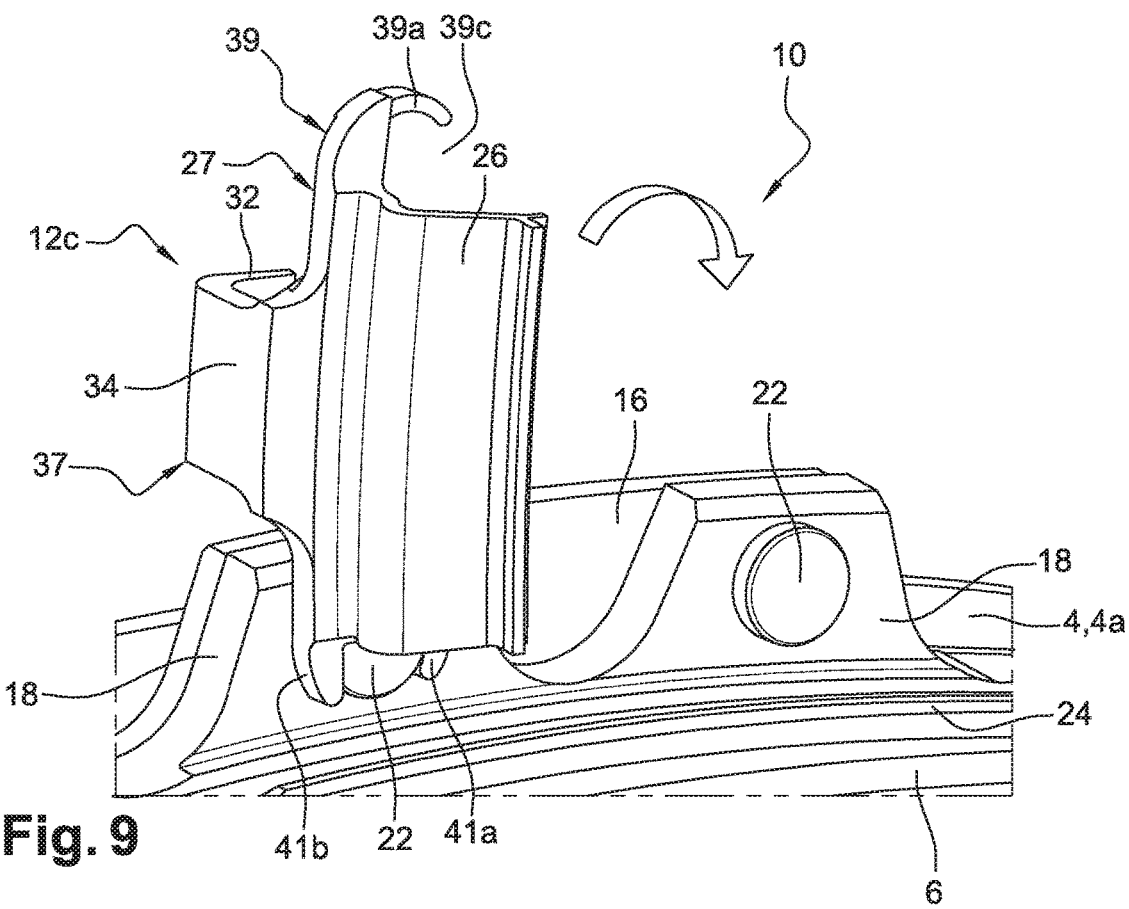
FIG. 9 is a perspective view of the entire FIG. 2 including the retaining member of FIG. 5, FIGS. 10a, 10b and 10c are schematic cross-sectional views showing various possible alternative solutions for radially securing the nozzle, the structural annular member and the retaining member.

FIG. 9 shows a third configuration of the assembly 10 in which a member according to the third embodiment, i. e. as shown in FIG. 5, is used. In this configuration, the mounting of the member 12c differs from the other configurations.

As a matter of fact, to be mounted, the member 12c must be pivoted and not only translated. Thus, first, the member 12c is positioned so that it extends in a radial direction. The member 12c is then radially moved so that the second slot 41c of the second ring 41 is elastically clipped onto the head 22 of a pin 14. In a subsequent step, the elastic tab 26 is deformed in the axial direction and the member 12c is rotated about the pin 14 receiving the second ring 41 until the first ring 39 is elastically clipped onto the head 22 of a pin 14. The interest of the specific sizing of the slots 39c, 41c with respect to the diameter of a pin 14 to perform an elastic clipping/unclipping function of a ring 39, 41 of the member 12c on a pin 14 is now clear. At this point, the elastic tab 26 is in the stop 24 and the compressive stress of the tab 26 can be released, with the first portion 27 being then applied onto the first flange 18 and the elastic tab being applied to the stop 24.

Figures 10A, 10B, 10C:
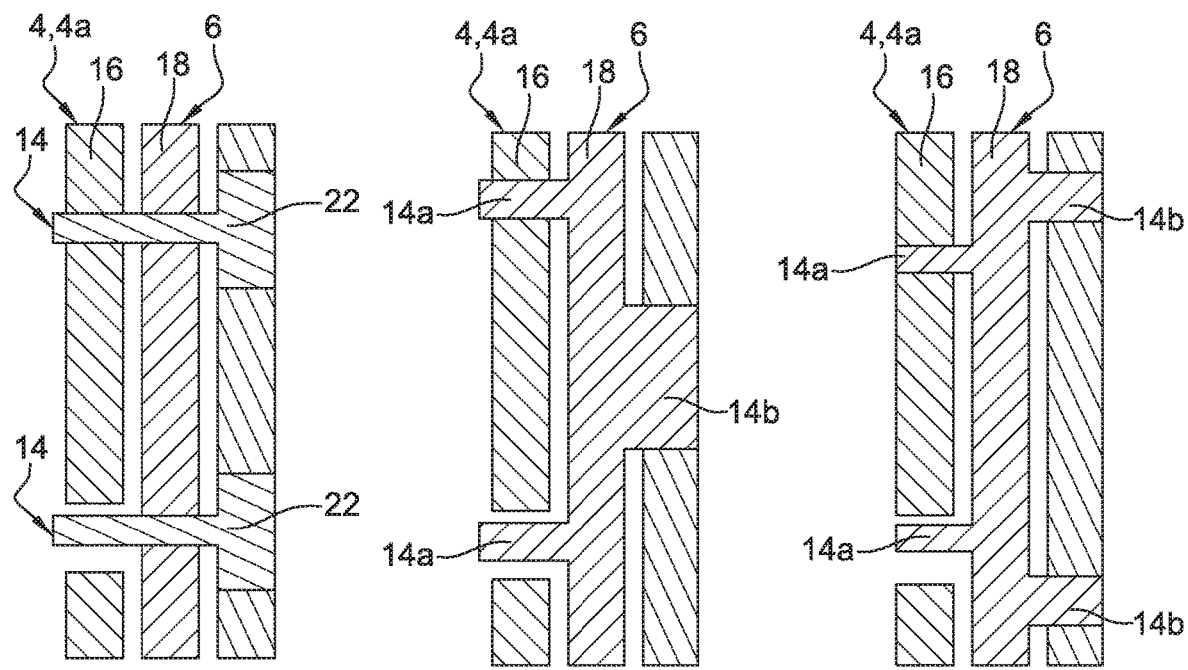

FIGS. 10a to 10c represent, in a schematic way, various alternative solutions of the embodiment of pins 14.

In FIG. 10a, the pins 14 are as previously described, i. e. they have a body and a head 22 and are attached to the first flange 18 of structural element 6, for example by shrinking.

In FIGS. 10b and 10c, the pins 14 are made up of two spatially separated portions, namely an upstream portion 14a which cooperates with the flange 16 of the nozzle 4, and a downstream portion 14b which cooperates with the member 12. In these alternative solutions, the upstream and downstream portions 14a, 14b of the pins 14 protrude from the first flange 16, i. e. the flange of the structural element 6.

According to the alternative solution shown in FIG. 10b, two upstream portions 14a surround a single downstream portion 14b. This alternative solution may be suitable for using a member 12 according to the first embodiment.

According to the alternative solution in FIG. 10c, two upstream portions 14a are surrounded by two portions 14b.

This alternative solution may specifically be suitable for using the members 12 according to the second, third and fourth embodiments.

Another alternative embodiment not shown in the Figures would be that the pins 14 in FIG. 10a are produced in one piece with the flange 18 of the structural element 6.

Similarly, the invention is not limited to the pins 14 and the stop 24 being carried by the structural element 6, they could also be carried by the second flange 16, i. e. the flange of nozzle 4, with the round and oblong holes 20a, 20b being then provided in the flange 18 of the structural element 6.

As shown in the Figures, the nozzle 4 consists of several angular sectors 4a arranged circumferentially end to end, with the assembly comprising several axial retaining members 12 each enabling the axial retention of a single sector 4a or two abutting sectors 4a. However, the nozzle 4 could be made in one piece and the assembly could then include a single axial retention member 12 or, on the contrary, several axial retention member(s).

The retaining member 12 which has just been described ensures the axial retention of nozzle 4 on structural element 6 while ensuring the displacement of one with respect to the other to meet the thermal deformation stresses of the portions in turbine engine 2.

In addition, this system is simple to operate since it does not require the use of tools and its mounting is reversible, i. e. if necessary, the member 12 can be dismounted and then reassembled to allow maintenance of the nozzle 4.

Besides, the retaining member 12 has a simple design, and manufacture and does not generate a significant additional weight for the turbine engine 2.

The invention claimed is:

1. An assembly (10) comprising:
    an annular nozzle (4) of a turbine of a turbine engine (2),
    a structural annular element (6) of the turbine engine (2),
    the nozzle (4) and the structural annular element (6) each comprising a radial flange (16, 18), the flanges being applied axially onto one another,
    at least one member (12) for axially retaining the flange (16) of the nozzle (4) with the flange (18) of the structural annular element (6), characterized in that the member (12) comprises:
        a first portion (27) applied in the axial direction onto a first flange (16, 18) of said nozzle (4) or said structural annular element (6), and comprising at least a first radial locking means (36, 39, 41) axially engaged with a second complementary radial locking means (14) formed on or secured to the first flange (18) for radially locking the member (12) on the first flange (16, 18), and
        a second hook-shaped portion (37) carried by the first portion (27) and having a free end (32) arranged opposite a second flange (16) of said nozzle (4) or of said structural annular element (6).

2. An assembly according to claim 1, wherein the first portion (27) carries a resiliently deformable tab (26) elastically stressed in the axial direction on an axial stop (24) of the nozzle (4) or the structural annular member (6), with the tab (24) extending opposite the second hook-shaped portion (37) with respect to the first portion (27).

3. An assembly (10) according to claim 2, wherein the resiliently deformable tab (26) comprises an angled portion (38) axially extending between the axial stop (24) and the first portion (27) of the member (12).

4. An assembly (10) according to claim 1, wherein said at least one first means is a ring (36, 39, 41) defining a housing receiving the second means (14) protruding from the first flange (18).

5. An assembly according to claim 4, wherein the ring (36, 39, 41) forms a portion of a first flank of a U-shaped portion the second flank of which is formed by the free end (32) of the second hook-shaped portion (37).

6. An assembly according to claim 1, wherein the first portion (27) of the member (12) comprises two first means which are two rings (36, 39, 41) circumferentially spaced from each other and each cooperating with a second means (14) of the first flange (18).

7. An assembly (10) according to claim 6, wherein said two rings (36, 39, 41) are arranged on either side of a circumferential wall (30) forming respectively a first flank and a second flank of a U-shaped portion with the free end (32) of the second hook-shaped portion (37).

8. An assembly (10) according to claim 6, wherein at least one of said two rings (39, 41) has a slot (39c, 41c).

9. An assembly (10) according to claim 7, wherein at least one of said two rings (39, 41) has a slot (39c, 41c).

10. An assembly (10) according to claim 6, wherein each ring (39, 41) has a slot (39c, 41c), said two slots (39c, 41c) being oriented at 90° to each other.

11. An assembly (10) according to claim 1, wherein the second means is a pin (14) passing through the flange (16) of the nozzle (4) and the flange (16) of the structural annular member (6) and having a portion or a head (22) protruding from the first flange (18) towards the stop (24).

12. An assembly (10) according to claim 1, wherein the free end (32) of the hook is arranged with an axial clearance (J) opposite the second flange (16).

13. An assembly (10) according to claim 1, wherein the nozzle (4) is formed of a plurality of angular sectors (4a) arranged circumferentially end-to-end, with the assembly (10) comprising a plurality of axially retaining members (12) each enabling the axial retention of a single sector (4a) or two abutting sectors (4a).

14. An axially retaining member (12) for an assembly (10) according to claim 1, characterized in that it comprises:
    a U-shaped portion (28) comprising a first flank (30) and a second flank (32) facing each other,
    a resiliently deformable tab (26) protruding from the first flank (30) in a direction opposite the second flank (32), and
    at least one ring (36, 39, 41) the outline of which extends in the same plane as the first flank (30).

* * * * *